United States Patent [19]

de Geus

[11] 4,204,799
[45] May 27, 1980

[54] HORIZONTAL WIND POWERED REACTION TURBINE ELECTRICAL GENERATOR

[76] Inventor: Arie M. de Geus, 6625 - 4th St. South, St. Petersburg, Fla. 33705

[21] Appl. No.: 927,046

[22] Filed: Jul. 24, 1978

[51] Int. Cl.² .............................................. F03D 1/04
[52] U.S. Cl. .......................................... 415/2; 416/121
[58] Field of Search ........................................ 415/2–4; 416/121 A

[56] References Cited

U.S. PATENT DOCUMENTS

| | | | |
|---|---|---|---|
| 1,312,021 | 8/1919 | Dickinson et al. | 415/4 X |
| 1,578,923 | 3/1926 | Schlotter | 415/4 X |
| 3,986,787 | 10/1976 | Mouton et al. | 415/7 |
| 4,021,135 | 5/1977 | Pedersen et al. | 415/2 |
| 4,075,500 | 2/1978 | Oman et al. | 415/2 X |
| 4,132,499 | 1/1979 | Igra | 415/2 |
| 4,140,433 | 2/1979 | Eckel | 415/2 |

FOREIGN PATENT DOCUMENTS

| | | | |
|---|---|---|---|
| 85590 | 3/1958 | Denmark | 416/189 A |
| 729534 | 12/1942 | Fed. Rep. of Germany | 415/4 |
| 975625 | 3/1951 | France | 415/2 |
| 56102 | 9/1952 | France | 415/4 |

Primary Examiner—Everette A. Powell, Jr.
Attorney, Agent, or Firm—Dressler, Goldsmith, Shore, Sutker & Milnamow

[57] ABSTRACT

A horizontal wind powered electrical generator is disclosed in which a horizontal reaction turbine is disposed within an augmentor cowling which extends downwind of the turbine. First stage curved stator blades interconnect the augmentor with the turbine cowling, and secondary stator blades are spaced downwind from said primary stator blades to extend inwardly from the augmentor to terminate short of the turbine cowling. These secondary stator blades have a greater angle of departure than the primary stator blades to increase the rotational velocity of the air at the expense of its axial velocity while permitting the axial velocity of the air moving inwardly of the secondary stator blades to be undiminished. A venturi-structured diffusor is carried by said augmentor in a downwind position to lower the pressure generally and assist the action of the secondary stator blades.

9 Claims, 2 Drawing Figures

HORIZONTAL WIND POWERED REACTION TURBINE ELECTRICAL GENERATOR

DESCRIPTION

Technical Field

The present invention relates to wind powered reaction turbines for the production of electrical energy.

Background Art

Numerous devices for converting the power of the wind into electrical energy have been proposed and tested, but none have been particularly successful, so wind power today satisfies very little of our electrical generating needs. One of the most interesting of the recent developments is the vortex generator in which a turbine is mounted beneath a vaned enclosure in which vanes are selectively opened to cause a cyclone to develop within the enclosure. This provides a reduced pressure at the turbine exhaust which greatly increases the power output of the turbine with respect to the same turbine located in a freely flowing windstream. Unfortunately, the enclosures must be very large to work well, requiring a height of at least about 9 times the diameter of the turbine blades, so the final structure is expensive and unwieldy.

It has also been proposed to employ a horizontal turbine surrounded by a cowling disposed within a horizontal augmentor, as described in U.S. Pat. No. 4,021,135, but the structure was poorly designed and did not function well for many reasons. Curiously, the patent states that it employs a reaction type turbine wheel instead of an impulse type turbine. However, the opposite is the fact since the air moving through the turbine is straightened by the radial blades 16c and deflected by the rotating blades 15 so as to move these blades mostly by impulse. As a result, the air emanating from the turbine rotates and this rotation is required to be in the same direction as the rotating air in the vortex produced behind the turbine by the augmentor. Even if the turbine rotor used in the patent were designed for reaction purposes, most of the rotation would be the result of impulse. A proper reaction turbine required a properly designed row of stator blades and the exhaust gases are aligned with the axis of the turbine for most efficient operation.

The use of a reaction turbine in a horizontal structure which must be pivotally mounted to track the wind requires that a vortex be developed to produce a low pressure zone behind the turbine as quickly as possible. Otherwise, the augmentor must be very long and the structure becomes larger, heavier, more expensive, and less able to pivot to accommodate a change in wind direction.

Disclosure of Invention

In accordance with this invention, a horizontal reaction turbine with downwind rotor blades is concentrically mounted within an augmentor which is at least about 2.5 times greater in diameter than the rotor blades. Radial stator blades are positioned at the entrance portion of the augmentor extending between the cowling around the turbine and the cowling which defines the augmentor. The curvature of these stator blades provides a first stage of rotation for the entering air and the maximum curvature is about 35°, and the curvature of the blades is constant over the length of the blades. The rotary air movement produced by the first stage stator blades in the augmentor is not adequate to develop an effective vortex within a distance of less than about 3 times the diameter of the augmentor, and this is excessive, so two factors are combined to permit this distance to be reduced. This is done by using a diffusor having a venturi to produce a reduced pressure in the downwind portion of the augmentor, and by adding a second stage of more sharply curved stator blades in the central portion of the augmentor. The diffusor is positioned downwind of the augmentor and it extends concentrically around the same.

The augmentor is mounted for pivotal movement so that the entire structure can turn, and means are provided to pivot the structure in response to wind direction. These means are preferably constituted by at least one downwind vane carried by the diffusor.

The result is a smaller and lighter structure which is less massive than the prior vertical structures and which is even more efficient from the standpoint of the ratio between the power output and the diameter of the rotor blades.

The invention will be more fully described in conjunction with the accompanying drawings.

BRIEF DESCRIPTION OF THE DRAWINGS

Referring to FIG. 1, a reaction turbine 10 including curved stator blades 11 which overlap each other and reversely curved rotor blades 12 is mounted within a cowling 13 which is connected by means of curved stator blades 14 to an augmentor cowling 15. All of the above elements are horizontal and are symmetrical about the axis 16.

Figure 1:
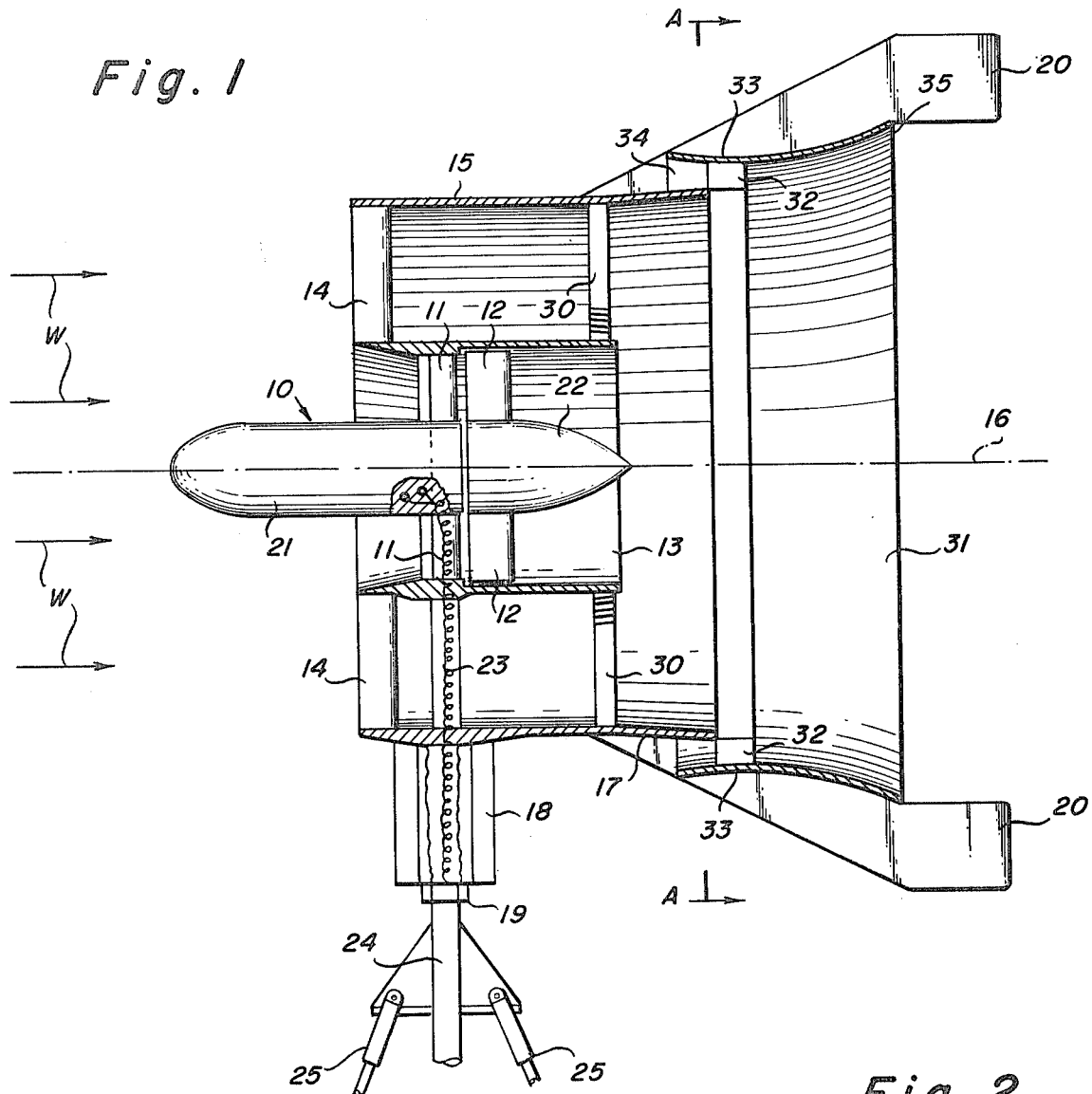
FIG. 1 is a cross section taken on a vertical plane through the center of an illustrative wind powered reaction turbine constructed in accordance with this invention.

The augmentor is defined by cowling 15 which is simply a thin tube, normally made of metal, such as aluminum, and it can have a uniform cross-section throughout its length. In the preferred form pictured, the trailing section of the augmentor cowling 15 has a slight outward flare 17, but this is not essential.

The augmentor is strengthened on its underside and is secured to a bearing housing 18 which rests upon a supporting nut 19 threaded to the supporting post 24. Appropriate bracing 25 is used to provide the desired structural integrity.

The reaction turbine 10 is constituted by a generator section 21 which is held in place by the curved stator blades 11, and the generator section 21 rotatably supports the rotor section 22. As will be evident, rotation of rotor 22 actuates generator 21 to produce an electrical current which is carried away by wires 23.

If the structure described to this point were all that were involved, the wind generator would not be very efficient because the augmentor is not long enough to create a mature vortex. As a result, the pressure behind the turbine would not be optimally reduced.

A mature vortex is provided herein by a combination of a second stage of stators carried by the augmentor but which do not reach the turbine cowling 13 and a venturi-structured diffuser which is carried by the augmentor in a downwind position.

Referring first to the second stage of stators, these are identified at 30, and they are formed to provide a greater angle of departure than the first stage stator blades 14. In typical practice, the first stage blades have an angle of departure of about 30–35° while the second stage has an angle of departure of about 65–70°. Also, the blades 30 terminate at about 50–65% of the distance from the augmentor 15 to the turbine cowling 13, allowing the air which passes through blades 30 to acquire increased rotational velocity at the expense of axial velocity, and allowing the air which moves past the turbine without encountering blades 30 to move with undiminished axial velocity. The result is a mature vortex close behind the second stage stator blades 30.

The second stage of stator blades is spaced downwind of the first stage and is preferably positioned at the downwind end of the turbine cowling 13. As the second stage stators are moved in either direction away from the preferred position, they continue to function, but the action is less favorable. These second stage stators are of increasing benefit as they extend further into the augmentor, but as they get near the turbine cowling efficiency falls off. Performance is optimized at about 50% to about 65% of the distance from the augmentor cowling to the turbine cowling.

It is desired to point out that vortex-type flow is partially established between the first and second stator stage and is fully established shortly downstream of the second stage.

To permit the stator blades 30 to function well, and also to lower the downstream pressure generally, a diffusor 31 is carried by the augmentor 15 in a downstream position by means of stator blades 32 which are curved in the same direction as blades 14 and 30. The diffusor 31 is a venturi because it has a central portion 33 in the vicinity of blades 32 which has a smaller diameter than the inlet portion 34 or the outlet portion 35.

The reduced pressure established by diffusor 31 helps to pull the air through blades 30 and renders them more efficient.

The augmentor and its associated diffusor together have a length of at least about 0.8 times the diameter of the augmentor, and the preferred length is from 1.0 to 1.5 times the diameter of the augmentor. This can be contrasted with a ratio of 3.0, or much higher, in the prior art. The augmentor is preferably from 2.5–5 times the diameter of the rotor blades.

The action of the wind generator can now be described. The wind, identified by arrow W, enters the turbine 10 where it moves through the oppositely curved stator blades 11 and rotor blades 12 to exhaust with little if any rotational movement as represents proper design of any efficient reaction turbine. This same wind enters the augmentor 15 where it is deflected by stator blades 14 to develop a vortex-type rotation. Rotation is amplified by blades 30 near the outer walls of the augmentor at the expense of axial velocity, while the axial velocity inwardly of blades 30 is not slowed. The function of blades 30 is accentuated by the downwind venturi-structured diffuser 31 which also serves to generally reduce pressure which increases the velocity of the air inwardly of blades 30. As a result, the desired vortex is established more quickly, and this produces a reduced pressure behind the turbine to greatly increase the power output. The vanes 20 keep the composite structure facing into the wind.

Figure 2:
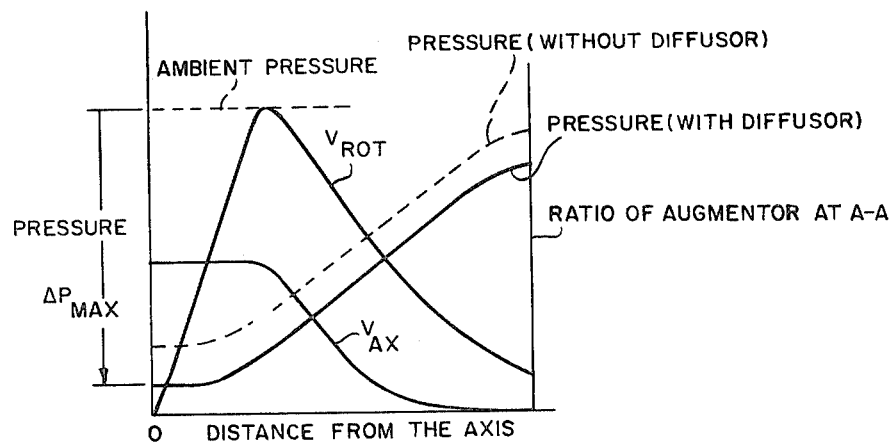
FIG. 2 is a graph in which the rotational air speed, the axial air speed, and the pressure are set forth on coordinates in which the abcissa is the radial distance in the augmentor and the ordinate is the pressure downstream of the turbine.

Referring to FIG. 2, the characteristics obtained at the line A—A are reported in graphical form. Referring first to the rotational speed this function is graphed at $V_{ROT}$ and it shows that the velocity is low at the augmentor wall, and it is about equal to the velocity of the wind outside the structure. As we move inwardly, the velocity increases as a hyperbolic function to a maximum at a position slightly inwardly of the turbine cowling 13. This velocity at the maximum will be 6–8 times faster than the wind outside the structure. Thereafter, the velocity drops off linearly to near zero at the center, which represents the eye of the hurricane.

The axial velocity is shown at $V_{AX}$, and the graph shows that this velocity is low near the augmentor while it becomes rapid toward the center of the structure.

The graph also presents a dotted line showing the pressure within the structure when a diffuser is not present, and a solid line showing the lower pressure achieved when a diffuser is present. The maximum pressure drop over the turbine is identified by the legend $\Delta P_{MAX}$.

What is claimed is:

1. A horizontal wind powered electrical generator comprising, a horizontal reaction turbine comprising overlapping curved stator blades and downwind reversely curved rotor blades disposed within a turbine cowling, an augmentor cowling surrounding said turbine and extending downwind thereof, first stage curved stator blades interconnecting said augmentor cowling with said turbine cowling; said augmentor cowling having a diameter of at least about 2.5 times the diameter of said rotor blades, secondary stator blades spaced downwind from said first stage stator blades and extending inwardly from said augmentor cowling to terminate short of the turbine cowling, said secondary stator blades having a greater angle of departure than said first stage stator blades to increase the rotational velocity of the air passing through the secondary stator blades at the expense of its axial velocity while permitting the air moving inwardly of the secondary stator blades to move with undiminished axial velocity, a venturi-structured diffusor carried by said augmentor cowling in a downwind position to lower the pressure generally and assist the action of the secondary stator blades, and means to pivot the composite structure to keep it facing into the wind.

2. An electrical generator as recited in claim 1 in which said secondary stator blades are positioned at the downwind end of the turbine cowling.

3. An electrical generator as recited in claims 1 or 2 in which the angle of departure of said first stage stator blades is about 30°–35°.

4. An electrical generator as recited in claim 3 in which the angle of departure of said second stage stator blades is about 65°–70°.

5. An electrical generator as recited in claims 1 or 2 in which said second stage stator blades terminate at from 50%–65% of the distance from said augmentor cowling to said turbine cowling.

6. An electrical generator as recited in any of claims 1, 2 or 4 in which the combined length of said augmentor cowling and diffusor is at least about 0.8 times the diameter of said augmentor.

7. An electrical generator as recited in claim 6 in which the diameter of the augmentor cowling is from 2.5 to 5 times the diameter of said rotor blades.

8. An electrical generator as recited in claim 1 in which the means to pivot the entire structure includes vanes carried by said diffusor.

9. An electrical generator as recited in claim 1 in which said diffusor is secured to said augmentor cowling by means of curved stator blades.

* * * * *